Jan. 14, 1930. B. E. CLARKSON 1,743,531
BOX AND COVER STRUCTURE
Filed March 24, 1927
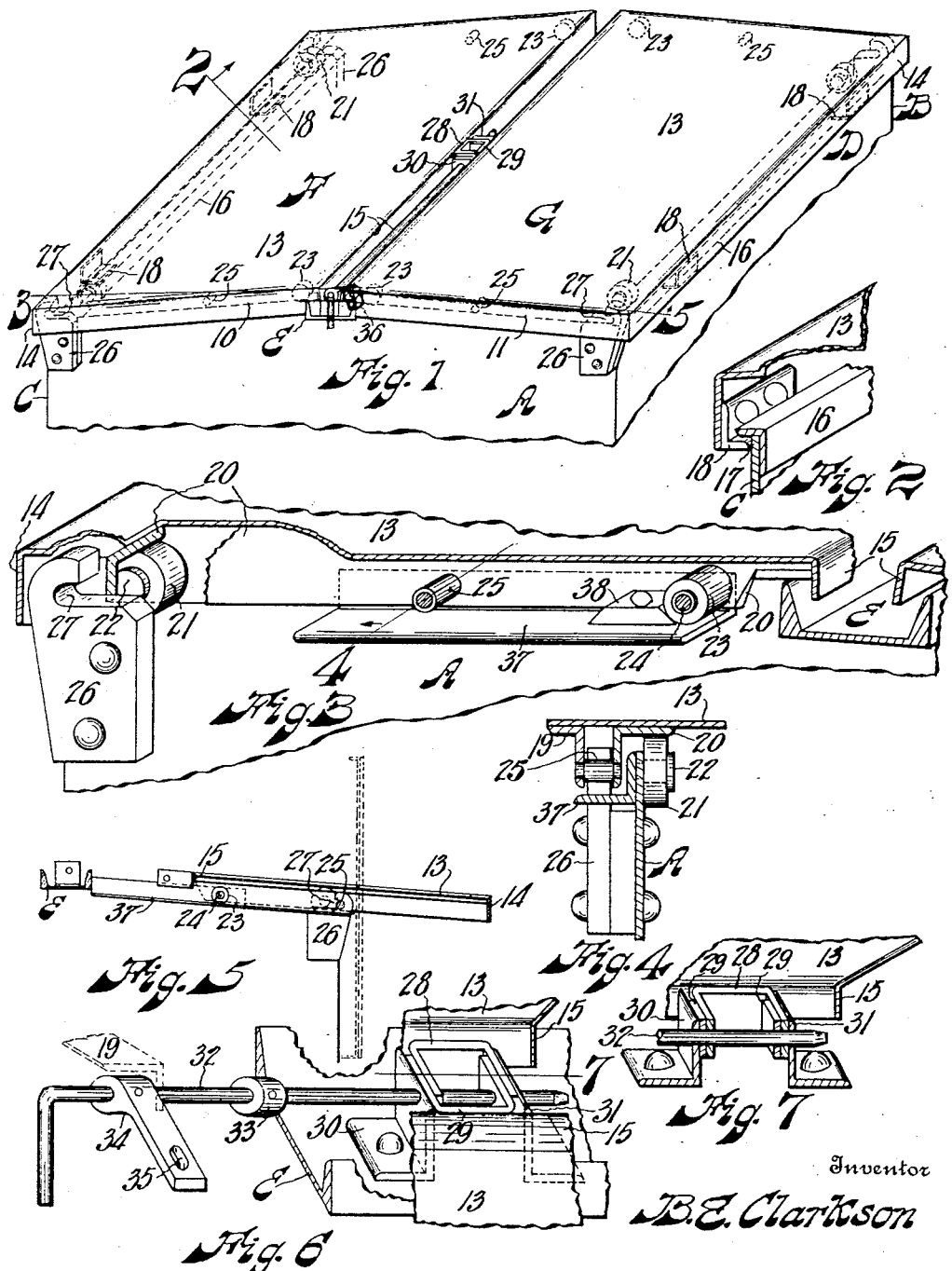
Inventor
B. E. Clarkson
By C. F. Heinkel
Attorney Patented Jan. 14, 1930

1,743,531

UNITED STATES PATENT OFFICE

BRADLEY E. CLARKSON, OF CLEVELAND, OHIO

BOX AND COVER STRUCTURE

Application filed March 24, 1927. Serial No. 177,930.

My invention relates to box and cover structures and mechanism between, or associated with, the box and the cover.

Some of the objects of my invention are a box and cover structure of simple and inexpensive structure; efficient in operation; the cover easily removable from or placeable on the box; even ventilating space all around between the cover and the box; the cover automatically located on the box to insure the even space mentioned; the cover overlapping the box to shed water or other substance; the cover lockable to the box in the most economical manner; a two part cover, each part lockable to the other and to the box in one locking operation. Other objects will appear, or become apparent or obvious, or suggest themselves, during the description of the particular apparatus shown in the accompanying drawings.

In box and cover structures wherein the cover is heavy in weight, as in storage battery boxes for storage battery locomotives for instance, which cover must be moved to open and to close the box, it is quite inconvenient and expensive to handle the cover for such opening and closing, or for locating the cover on the box for proper ventilation, or for locking the cover to the box.

My invention aims to provide the necessary means for easy handling of the cover and automatically locking the cover on the box, and easily and effectively locking the cover to the box.

Generally speaking, my invention contemplates to slide or roll or laterally move a cover a certain distance on a box to partly open the same and then tilt or swivel or pivot the cover to further open the box and to reverse this operation to close the box in order to handle the cover with a minimum expenditure of the time and effort; to provide the necessary means to automatically space or locate the cover on the box to insure even ventilating space all around between the cover and the box and to eliminate the necessity of independently locating the cover on the box; and to provide the necessary means to effectively lock the cover to the box with one locking operation so that the cover can not be moved in any direction while it is so locked and to completely cover the box and the ventilating space while the cover is in locking position.

In order to illustrate my invention, for a full understanding thereof, without any intention of limiting myself by such illustration, I have selected one certain box and cover structure and have shown the same in the accompanying drawing in which:—

Fig. 1 is a general perspective view of the upper portion of a box and cover structure embodying the features of my invention and having a cover made in two parts or units each operable independently of or conjointly with the other and oppositely inclined and sloping downward from the center.

Fig. 2 is a sectional view taken in a vertical plane indicated by the line 2 in Fig. 1 and shows the space between the cover and the box and the means to automatically locate the cover on the box more clearly and on a larger scale.

Fig. 3 is a sectional view taken in a vertical plane indicated by the line 3 in Fig. 1 and shows the relations between the rollers and the tracks and the covers and the box and the fulcrum elements more clearly and on a larger scale.

Fig. 4 is a sectional view taken in a vertical plane indicated by the line 4 in Fig. 3 and shows the transverse relation of the elements shown in Fig. 3 more clearly.

Fig. 5 is a sectional view taken in a vertical plane indicated by the line 5 in Fig. 1 and shows, in full lines, one of the covers opened to the limit of its lateral movement where both of the fulcrum elements assemble to form the fulcrum joint for tilting or pivoting and also shows, in dotted lines, the cover tilted or pivoted to the full open position thereof.

Fig. 6 is a perspective view of the lock means between the two covers and the box on a larger scale.

Fig. 7 is a sectional view taken in a vertical plane indicated by the line 7 in Fig. 6 and shows the relation between the lock elements and the box more clearly.

Similar reference characters refer to similar parts throughout the views.

Notation is made here that the device shown in the drawing is symmetrical; both sides and both ends and the four track and roller means are duplicates which feature results in simplicity and in inexpensive structure.

In the device shown in the drawing, the end walls A and B of the box are duplicates; each has the upper edges 10 and 11 oppositely inclined in the present instance. The side walls C and D of the box are duplicates and join the end walls. A suitable bottom may be provided to complete the box. The box itself is open at the top in the present instance.

The trough or gutter E, formed of channel iron with the flanges 12 extending upwardly in the present instance, extends longitudinally across or over the middle or central portion of the open top of the box and has the longitudinal ends thereof secured to the upper end of the walls A and B between the inclined edges 10 and 11.

The device shown has a two part cover or really two covers F and G, each being a duplicate of the other and having the body portion 13, the flange 14 on one longitudinal side or edge thereof and the flange 15 on the other longitudinal side or edge thereof. The flanges 14 are spaced from the side walls C and D. The shelves 16, of angle iron in the present instance, extend outwardly from and beyond each wall but do not extend to the flanges 14 to leave the space 17 for ventilating purposes. The shelves 18, of short pieces of angle iron in the present instance, are secured to the flanges 14 and extend over the underside of the shelves 16 and extend to within a short distance from the walls C and D. These shelves 18 space the flanges 14 equally from the walls C and D to provide even or equal ventilating space. A further purpose of the shelves 18 is to prevent that side of the covers which have the flanges 14 from being raised off of the box while the covers are in closing position on the box.

The flanges 15 extend into the gutter E adjacent to the edges thereof and spaced therefrom to provide ventilating space when the covers are in closing position on the box.

The angles 19 and 20 are secured to the covers at each end thereof and form flanges which overlap the end walls A and B and are spaced therefrom to provide ventilating space. The angles 20 also serve as a track for rollers as will be explained later.

The rollers 21 are journaled on the pins 22 which are secured to the corresponding portions of the walls A and B and are located so that the rollers 21 run on one of the legs of the angles 20 which form a track for them. It is observed that the rollers 21 are located on the end walls of the box near the side walls thereof; therefore, the outer side of the covers are supported on the rollers 21 when the covers are in closing position on the box and are further supported thereon during the lateral opening and closing movement of the covers.

The rollers 23 are mounted on the shafts 24 which are mounted in the spaced angles 19 and 20. The shafts or pins 25, duplicates of the shafts 24, are also mounted in the spaced angles 19 and 20 and form one part or one member of a fulcrum joint. It is preferred that the pins 25 are so located on the cover that the longitudinal axis thereof coincides either with the axis of the center of gravity of the cover or close to it so that the covers can be tilted or pivoted without the necessity of handling the weight of the covers.

The brackets 26 are secured to the end walls A and B and have the journal bearing 27 open on one side; the open side being disposed toward the center of the device in the four brackets. The axes of the pins 25 and the shafts 24 and the bearing 27 are all in the same plane on each end of each cover in the present instance.

The locking means shown comprises the U-shaped brackets 28 and 29 each secured to the corresponding portions of the flange 15 on the cover and the open legs thereof overlap or interlock or telescope over each other, and the brackets 30 and 31 secured to the gutter E, and the rod 32 extendible through the brackets on the covers as well as through the brackets on the gutter.

The rod 32 is journaled in the angle 19 on one end of one of the covers and has the collar 33 to limit the outward movement of the rod and to retain the rod on the device so that it can not be lost or displaced. The bracket 34 has one end thereof secured to the rod and the other end has the slot 35 which corresponds to a similar slot in one of the covers for the purpose of inserting a lock means, such as the padlock 36 for instance, through them to prevent unauthorized opening of the box.

Each of the brackets 28, 29, 30, and 31 has holes through the legs thereof; all holes being in alignment when both of the covers are in closing position; and all holes of a size to permit the rod to be extended through them.

Two tracks, of angle iron in the present instance, are secured to the outside of each of the end walls and each track 37 has the member 38 secured thereon and each member 38 has an inclined surface or plane at each end thereof.

Explaining now the operation of the device shown and described:—

When the covers are in closing position on the box as shown in Fig. 1; one side of each cover rests on two of the rollers 21 and the other side has the rollers 23 which rest on the tracks 37 which are secured to the box; the rollers 23 abut one of the inclined planes on the members 38 and thereby hold the covers in position; the flanges 15 extend into the gutter E and drain water or other substance into the gutter and thereby prevent the same from entering the box; the rod 32 extends through all of the ears and thereby locks the covers to each other and locks both covers to the box; the padlock 36 prevents the rod from being withdrawn from the brackets; the flanges 14 overlap or telescope over the sides of the box and are spaced therefrom to provide ventilating space; the angles 20 overlap the ends of the box and are spaced therefrom to provide ventilating space; the covers are held above the box to provide ventilating space; the flanges 15 are spaced from the walls of the gutter to provide ventilating space; and the shelves 18 prevent the outer ends of the covers from being raised off of the box.

In order to open and uncover the box:—

Unlock and remove the padlock 36; move the rod 32 longitudinally until the collar 33 thereon abuts the angle 19 at which stage the inner end of the rod is removed completely from the brackets so that either one or both of the covers can now be moved from their closing position. After the covers are so unlocked, they remain in closing position since the rollers 23 thereon abut the inclined planes on the members 38 and thereby retain the covers in closing position even after they are unlocked.

Now move either one or both of the covers laterally or sidewise; this movement causes the rollers 23 to roll up on the inclined planes and thereby raises the flanges 15 out of the gutter since the covers are now fulcrumed on the rollers 21. Further lateral movement of the covers partly opens the box in that the covers roll on the rollers 21 and the rollers 23 on the covers roll on the tracks on the box. This lateral movement continues until the pins 25 enter the bearings in the brackets 26 through the open side thereof and is arrested and limited when the pins are seated in the bearings. Since the axis of the pins 25 is in alignment with the axis of the center of gravity of the cover, or in a position close to, or desirable to, this axis, the covers can be swiveled or pivoted or tilted on the now formed fulcrum joint without handling the weight of the covers to further or to fully open or uncover the box as indicated in Fig. 5.

The closing of the box entails nothing more than the reversal of the opening operation described.

The covers spaced from and overlapping the box provide ample ventilating means and prevent foreign matter, such as water, from entering the box; the covers can be locked effectively against movement in any direction with one locking means and in one locking operation; the covers can be moved to open and to close the box with little effort and without handling the dead weight of the covers; and the entire device is simple and inexpensive in structure and effective and efficient and lasting in operation.

I am aware that changes can be made in structure of the elements as shown and described as well as in the arrangements of elements as shown and described within the scope of the appended claims; therefore, without limiting myself to the precise structure and arrangement of elements as shown and described,

I claim:—

1. An open box, a cover for said box slidable traversely of the opening of said box during opening and closing movements thereof, means for supporting said cover over the open end of said box and spaced therefrom to provide ventilating space, and flange means on said cover and overlapping said open end of said box all around and spaced therefrom to provide ventilating space all around in communication with the first mentioned ventilating space when said cover closes said box.

2. An open box, a cover for said box slidable traversely of the opening of said box during opening and closing movements thereof, means for supporting said cover over the open end of said box and spaced therefrom to provide ventilating space, flanges on said cover and overlapping said open end of said box and spaced therefrom to provide ventilating space in communication with the first mentioned ventilating space, and spacers on said flanges to locate said cover centrally on said box and thereby equalize the second mentioned ventilating space all around said box.

3. An open box, a cover supportable on said box slidable traversely of the opening of said box during opening and closing movements thereof, means to provide ventilation space between the open portion of said box and said cover, and means to locate said cover on said box to maintain a ventilating space between said cover and said open portion and all around said open portion when said cover is in box closing position.

4. A storage battery box having an open end, a cover over said open end and slidable traversely of the opening of said box during opening and closing movements thereof and spaced therefrom to provide a ventilating space above said open end and having flange means telescoping over the outside of said open end and spaced therefrom to provide a ventilating space in communication with the first mentioned ventilating space and terminating below said open end.

5. An open box, a cover supportable on said box slidable traversely of the opening of said box during opening and closing movements thereof and having a flange extendible over a portion of a side of said box and spaced from said side to form a ventilating space, and means between said flange and said side to prevent said cover from being raised vertically of said side of the box and to locate said cover and to maintain said ventilating space.

6. A box, a roller journaled on said box near one side thereof, a cover having one side thereof resting on said roller and rollable thereon, a roller journaled on said cover near the side opposite said one side thereof, and a track for the second mentioned roller on said box.

7. A box, a cover movable laterally and tiltable on said box, a bracket on said box and having a journal open on one side, a pin on said cover and adapted to enter said journal through said open side thereof after said cover is moved laterally a certain distance and thereby form a journaled fulcrum joint to tilt said cover on a definite axis and limiting said cover in other movements.

8. A box, a roller journaled on said box, a cover movable laterally and tiltable on said box and supported on said roller, a roller on said cover, a track for the second mentioned roller on said box, a bracket on said box and having a journal open on one side, and a pin on said cover and adapted to enter said journal through said open side thereof after said cover is moved laterally a certain distance and thereby form a fulcrum joint to tilt said cover.

9. A box having a flange, a cover movable laterally on said box to open and to close the same and having a flange adjacent to said flange on the box, guide means between said box and said cover and having means for elevating said flange on the cover above said flange on the box during the first portion of the lateral opening movement of said cover and to lower said flange on the cover into said adjacent position during the last portion of the lateral closing movement of said cover.

10. A box, an inclined cover movable laterally on said box to open and to close the same, roller and inclined track means between said cover and said box, and an inclined plane on said track means to engage said roller means to retain said cover in closing position on said box.

11. A box having a flange, a cover movable laterally on said box to open and to close the same and having a flange adjacent to said flange on the box, roller and track means between said cover and said box, and an inclined plane extending upwardly from the top of said track means to engage said roller means to retain said flanges adjacent to each other and to elevate said flange on the cover above said flange on the box during the first portion of the lateral opening movement of said cover and to lower said flange on the cover into said adjacent position during the last portion of the lateral closing movement of said cover.

12. A box having a flange, a roller journaled on said box, a cover movable laterally and tiltable on said box and having a flange adjacent to said flange on the box, the side of said cover opposite the flange thereon being supported on said roller, a roller journaled on said cover, a track on said box for the last mentioned roller and having an elevated portion to abut the last mentioned roller to retain said flanges adjacent to each other and to raise said flange on the cover above said flange on the box during the first portion of the opening movement of said cover and to lower said flange on the cover into said adjacent position during the last portion of the closing movement of said cover, means for terminating the lateral opening movement of said cover, and means for tilting said cover on said roller on the box.

13. A box having a flange, a roller journaled on said box, a cover movable laterally and tiltable on said box and having a flange on one side edge thereof adjacent to said flange on the box, the side of said cover opposite the flange thereon being supported on said roller, a roller journaled on said cover, a track on said box for the last mentioned roller and having an elevated portion to abut the last mentioned roller to retain said flanges adjacent to each other and to raise said flange on the cover above said flange on the box during the first portion of the opening movement of said cover and to lower said flange on the cover into said adjacent position during the last portion of the closing movement of said cover, means for terminating the lateral opening movement of said cover, a bracket on said box and having a journal open on one side, a pin on said cover and adapted to enter said journal through said open side thereof when said cover is moved laterally a certain distance and thereby form a fulcrum joint to tilt said cover.

14. A box having a flange, a roller journaled on said box, a cover movable laterally and tiltable on said box and having a flange on one side edge thereof adjacent to said flange on the box, the side of said cover opposite the flange thereon being supported on said roller, a roller journaled on said cover, a track on said box for the last mentioned roller and having an elevated portion to abut the last mentioned roller to retain said flanges adjacent to each other and to raise said flange on the cover above said flange on the box during the first portion of the opening movement of said cover and to lower said flange on the cover into said adjacent position during the last portion of the closing movement of said cover, a bracket on said box and having a journal open on one side, a pin on said cover and adapted to enter said journal through said open side thereof when said cover is moved laterally a certain distance and thereby terminates the lateral opening movement of said cover and forms a fulcrum joint to tilt said cover, a flange on said opposite side of the cover, and means between the last mentioned flange and said box to prevent said opposite side of the cover from being raised off of said box while said roller on the cover is abutting said elevated portion of the track.

15. A box having a flange extending across the open portion thereof, a roller journaled on said box, a cover movable laterally and tiltable on said box and having flanges on two opposite sides thereof, one of said flanges disposed adjacent to said flange on the box, one side of said cover supported on said roller, a roller journaled on said cover, a track for the last mentioned roller and having an elevated portion to abut the last mentioned roller to retain said one flange and said flange on the box adjacent to each other and to raise said one flange above said flange on the box during the first portion of the opening movement of said cover and to lower said one flange into said adjacent position during the last portion of the closing movement of said cover, means for terminating the lateral opening movement of said cover, means for tilting said cover on said roller on said box, a flange on the side of said box, a shelf on the other one of said flanges of the cover below said flange on the side of the box to prevent said other one of the flanges from being raised above said box and to locate said cover on said box.

16. A box including a two part cover, each part mounted to move toward and away from the other to close and to open said box, ears projecting from each of said parts and overlapping the ears on the other of said parts when said parts close said box, and a pin extendible through all of said ears to lock said parts to each other.

17. A box, a gutter across said box, a plurality of covers each movable to open and to close said box, said covers spaced from the open end of said box and having flanges all around, some of said flanges spaced from the walls of said box and overlapping the same, and others of said flanges spaced from the walls of said gutter and overlapping the same.

18. A box, a gutter across said box, and a plurality of covers having flanges, some overlapping the walls of said box and others overlapping the walls of said gutter; each of said covers being movable to open and to close said box and the movement of each of said covers including a pivotal movement to eliminate the necessity of handling the weight of said covers.

19. A box, a gutter across said box, a cover on each side of said gutter, one edge of each of said covers draining into said gutter, the opposite edge of each of said covers having means to prevent the same from being raised off of said box, and lock means between both of said one edges of said covers.

20. A box, a gutter across said box, a cover on each side of said gutter, one edge of each of said covers draining into said gutter, ears extending from both of said edges and overlapping each other, ears extending from said gutter and overlapping the first mentioned ears, and a pin extendible through all of said ears.

21. A box, a gutter across said box, a cover on each side of said gutter, one edge of each of said covers draining into said gutter, the opposite edge of each of said covers having means to prevent the same from being raised off of said box, ears extending from both of said one edges and overlapping each other, ears extending from said gutter and overlapping the first mentioned ears, and a pin extendible through all of said ears.

22. A box having a track, a cover having a track, a roller journaled on said box and rollable on said track on the cover, a roller journaled on said cover and rollable on said track on the box, a bracket on said box and having a fulcrum journal bearing, a fulcrum pin on said cover in alignment with said journal bearing and with the path of said rollers and tracks.

23. A box having a track, a cover having a track, a roller journaled on said box and rollable on said track on the cover, a roller journaled on said cover and rollable on said track on the box, and an elevation on said track on the box in the path of said roller on the cover.

24. A box and two covers for the same having flanges overlapping said box when the same is closed; said covers being movable laterally in relation to said box to open and to close the same and having means to first move the same vertically to clear flanges thereof over said box and then to guide the same laterally on said box to partly open the same and then to pivot on said box to more fully open the same during the opening movement of said cover and to repeat these operations in reverse order during the closing movement of said cover.

In testimony of the foregoing I affix my signture.

B. E. CLARKSON.